(12) United States Patent  
Yanagi

(10) Patent No.: US 8,509,402 B2  
(45) Date of Patent: Aug. 13, 2013

(54) COMMUNICATION DEVICE

(75) Inventor: Satoru Yanagi, Obu (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 61 days.

(21) Appl. No.: 13/328,501

(22) Filed: Dec. 16, 2011

(65) Prior Publication Data

US 2012/0163572 A1   Jun. 28, 2012

(30) Foreign Application Priority Data

Dec. 22, 2010   (JP) .................................. 2010-286428

(51) Int. Cl.
*H04N 2201/093* (2006.01)

(52) U.S. Cl.
USPC ............. 379/100.01; 370/100.17; 370/100.06

(58) Field of Classification Search
USPC ................. 379/10.01, 100.06–100.09, 90.01, 379/100.07; 358/1.15, 402, 407, 434, 440, 358/442, 443; 709/238, 202, 223; 370/352
See application file for complete search history.

(56) References Cited

U.S. PATENT DOCUMENTS 6,438,605 B1 *   8/2002   Idehara ......................... 709/238  
7,738,130 B2 *   6/2010   Maeda .......................... 358/1.15

FOREIGN PATENT DOCUMENTS

JP   2000-261570 A   9/2000  
JP   2007-208448 A   8/2007

* cited by examiner

*Primary Examiner* — Melur Ramakrishnaiah  
(74) *Attorney, Agent, or Firm* — Scully, Scott, Murphy & Presser, PC

(57) ABSTRACT

A communication device may execute a first type of determination process based on a first type of determination standard, and execute a second type of determination process based on a second type of determination standard. The communication device may perform communication in accordance with a first communication scheme, if determined in the first and second types of determination process that the communication device can perform communication. The communication device may perform communication in accordance with a second communication scheme, if determined in the first type of determination process that the communication device can not perform communication. The communication device may notify specific information, if determined in the second type of determination process that the communication device can not perform communication, and may not notify, if determined in the first type of determination process that the communication device can not perform communication.

10 Claims, 5 Drawing Sheets

| Modes Capable of Being Selected by User | IPFAX Setting ON/OFF | Retry Setting ON/OFF |
|---|---|---|
| IPFAX Priority | ON | ON |
| IPFAX Exclusive | ON | OFF |
| IPFAX OFF (PSTNFAX Exclusive) | OFF | ON |
| ——— | OFF | OFF |

FIG. 6

| First Type of Determination Process (S32, S34, S46) | Second Type of Determination Process (S40, S42) | Notification (S60) | Third Type of Determination Process (S62) | Communication Scheme (IP:S52 or PSTN:S66) |
|---|---|---|---|---|
| YES | YES | — | — | IP |
| YES | — | Not Notify | YES | PSTN |
| YES | — | Not Notify | NO | — |
| NO | — | Notify | YES | PSTN |
| NO | — | Notify | NO | — |

COMMUNICATION DEVICE

CROSS-REFERENCE TO RELATED APPLICATIONS

This application claims priority to Japanese Patent Application No. 2010-286428, filed on Dec. 22, 2010, the contents of which are hereby incorporated by reference into the present application.

TECHNICAL FIELD

A technique disclosed in the present specification relates to a communication device.

DESCRIPTION OF RELATED ART

For example, a FAX device is known that is capable of performing FAX communication in accordance with a plurality of communication schemes such as G3-FAX and IP-FAX. G3-FAX is a communication scheme for performing FAX communication via a general public network (PSTN (Public Switched Telephone Network)). IP-FAX is a communication scheme for performing FAX communication in accordance with IP (Internet Protocol). G3-FAX may be susceptible to communication errors while IP-FAX may be less susceptible to communication errors.

BRIEF SUMMARY

When a communication device cannot perform communication, information indicating that communication cannot be performed is favorably notified to a user. The present specification discloses a technique which may appropriately notify the user of information indicating that the communication device cannot perform communication.

One technique disclosed in the present application is a communication device. The communication device may comprise one or more processors, and a memory that stores a computer program including instructions executed by the one or more processors. The instructions may cause the one or more processors, when executed by the one or more processors, to function as a first determination unit, a second determination unit, a first communication unit, a second communication unit, and a notification unit. The first determination unit may be configured to execute a first type of determination process that determines, based on a first type of determination standard, whether the communication device can perform communication of target data of a communication target in accordance with a first communication scheme. The second determination unit may be configured to execute a second type of determination process that determines, based on a second type of determination standard which is different from the first type of determination standard, whether the communication device can perform communication of the target data in accordance with the first communication scheme. The first communication unit may be configured to perform communication of the target data in accordance with the first communication scheme, if it is determined in the first type of determination process that the communication device can perform communication of the target data, and it is determined in the second type of determination process that the communication device can perform communication of the target data. The second communication unit may be configured to perform communication of the target data in accordance with a second communication scheme which is different from the first communication scheme, if it is determined in the first type of determination process that the communication device can not perform communication of the target data. The notification unit may be configured to notify a user of specific information, if it is determined in the second type of determination process that the communication device can not perform communication of the target data. The specific information may indicate that the communication device can not perform communication of the target data in accordance with the first communication scheme. The notification unit may be configured not to notify the user of the specific information, if it is determined in the first type of determination process that the communication device can not perform communication of the target data.

Moreover, a method executed by the communication device is also novel and useful. In addition, a computer program for realizing the communication device and a non-transitory computer-readable storage medium that stores the computer program are also novel and useful.

BRIEF DESCRIPTION OF THE DRAWINGS

FIG. 6 shows a relationship among determination results, presence/absence of notification, and types of communication.

DETAILED DESCRIPTION (System Configuration)

Figure 1:
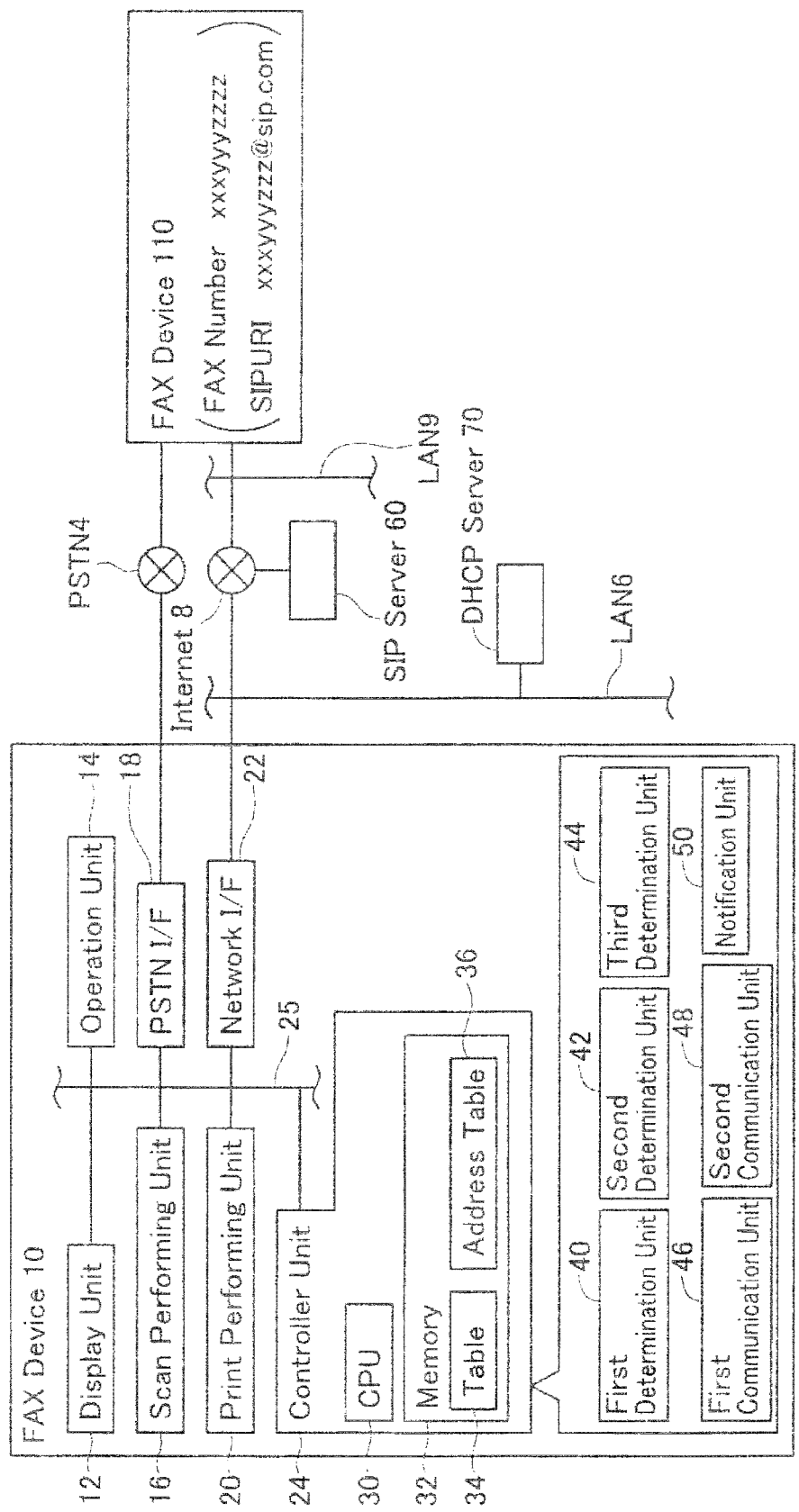
FIG. 1 shows an example of a configuration of a communication system.

As shown in FIG. 1, a communication system 2 comprises a plurality of FAX devices 10 and 110. The FAX devices 10 and 110 are respectively connected to a PSTN 4. Therefore, both FAX devices 10 and 110 are capable of communicating with each other via the PSTN 4. In addition, the FAX device 10 is connected to a LAN 6 and the FAX device 110 is connected to a LAN 9. The LANs 6 and 9 are respectively connected to the Internet 8. Therefore, both FAX devices 10 and 110 are capable of communicating with each other via the LANs 6 and 9 and the Internet 8. A DHCP (Dynamic Host Configuration Protocol) server 70 is connected to the LAN 6. A SIP (Session Initiation Protocol) server 60 is provided on the Internet 8.

(Configuration of FAX Device 10)

The FAX device 10 comprises multiple functions such as a PSTNFAX function, an IPFAX function, a copier function, a printer function, and a scanner function. The PSTNFAX function is a function for performing FAX communication via the PSTN 4 (in other words, sending and receiving FAX data) using a FAX number (in other words, a numerical string of a predetermined number of digits (for example, 10 digits)) that is used by the PSTN 4. The PSTNFAX function is realized in accordance with the G.3 communication scheme. In addition, the IPFAX function is a function for performing FAX communication via an IP network (the LAN 6, the Internet 8, or the like) using a URI (Uniform Resource Identifier). The IPFAX function is realized in accordance with a SIP communication scheme. However, the IPFAX function may be realized by other protocols as long as such protocols are premised on IP.

The FAX device 10 comprises a display unit 12, an operation unit 14, a scan performing unit 16, a PSTN interface 18, a print performing unit 20, a network interface 22, and a controller unit 24. The respective units 12 to 24 are connected to a bus line 25. The display unit 12 is a display for displaying various kinds of information. The operation unit 14 is composed of a plurality of keys. By operating the operation unit 14, a user can input various instructions to the FAX device 10. The scan performing unit 16 comprises a scanning mechanism such as a CIS or a CCD, and creates image data by scanning a scan target. The PSTN interface 18 is connected to the PSTN 4. The print performing unit 20 comprises a printing mechanism adopting an inkjet head system, a laser system, or the like, and performs printing in accordance with an instruction from the controller unit 24. The network interface 22 is connected to the LAN 6.

The controller unit 24 comprises a CPU 30 and a memory 32. The CPU 30 executes processes in accordance with a program (not shown) stored in the memory 32. Functions of the respective units 40 to 50 are realized by the execution of processes by the CPU 30 in accordance with the program. The memory 32 stores a table 34 and an address table 36. The table 34 includes at least one enterprise-number that indicates at least one specific provider. The "specific provider" is a provider that provides an IPFAX function utilizing a SIPURI including a FAX number (in other words, a SIPURI obtained by adding a predetermined domain to a FAX number). Moreover, an enterprise-number is a corporate code number unique to each provider. In addition, the address table 36 includes a plurality of FAX numbers, telephone numbers, and the like inputted by the user.

Moreover, the table 34 is stored in advance in the memory 32. For example, the table 34 may be stored in advance in the memory 32 by a vendor of the FAX device 10. In addition, for example, the FAX device 10 may obtain the table 34 from a predetermined server (for example, a server provided by a vendor of the FAX device 10) and store the table 34 in the memory 32 in advance.

(Configuration of SIP Server 60)

The SIP server 60 is a server that is provided by the specific provider. The SIP server 60 is a server (which can also be referred to as a "call control server") that intermediates SIP communication. For example, while various commands for establishing a SIP communication session are communicated between the FAX device 10 and the FAX device 110, the commands are transmitted via the SIP server 60. After the SIP communication session is established, normally, the FAX devices 10 and 110 perform communication of audio data for a telephone call or FAX data (in other words, image data) without involving the SIP server 60 (in other words, the FAX devices 10 and 110 perform peer-to-peer communication). Moreover, in astute where the user of a FAX device (for example, the FAX devices 10 and 110) has already established an account with the specific provider, the SIP server 60 stores an IP address of the FAX device and a SIPURI of the FAX device in association with each other.

(Configuration of DHCP Server 70)

The DHCP server 70 assigns an IP address to each device (the FAX device 10 and the like) connected to the LAN 6. In addition, the DHCP server 70 stores DHCP information. The DHCP information includes Option 120 (an IP address of the SIP server) and Option 125 (provider information indicating the provider) which will be described later.

(Configuration of FAX Device 110)

The FAX device 100 comprises functions similar to the respective functions of the FAX device 10. In the present embodiment, a user of the FAX device 110 has an account with the specific provider (in other words, the provider that provides an IPFAX function using a SIPURI including a FAX number). Therefore, a SIPURI "xxxyyyzzzz@sip.com" (a SIPURI obtained by adding a domain of the SIP server 60 to the FAX number of the FAX device 110) including a FAX number "xxxyyyzzzz" of the FAX device 110 is assigned to the FAX device 110.

(Advance Preparation by User: Establishing Account with Provider)

Advance preparation to be performed by the user of the FAX device 10 will be described. The user establishes an account with the specific provider. In this case, a SIPURI including a FAX number of the FAX device 10 is assigned to the FAX device 10. Consequently, the FAX device 10 is now capable of executing the IPFAX function.

(Advance Preparation by User: Selecting Mode)

Figures 2, 3:
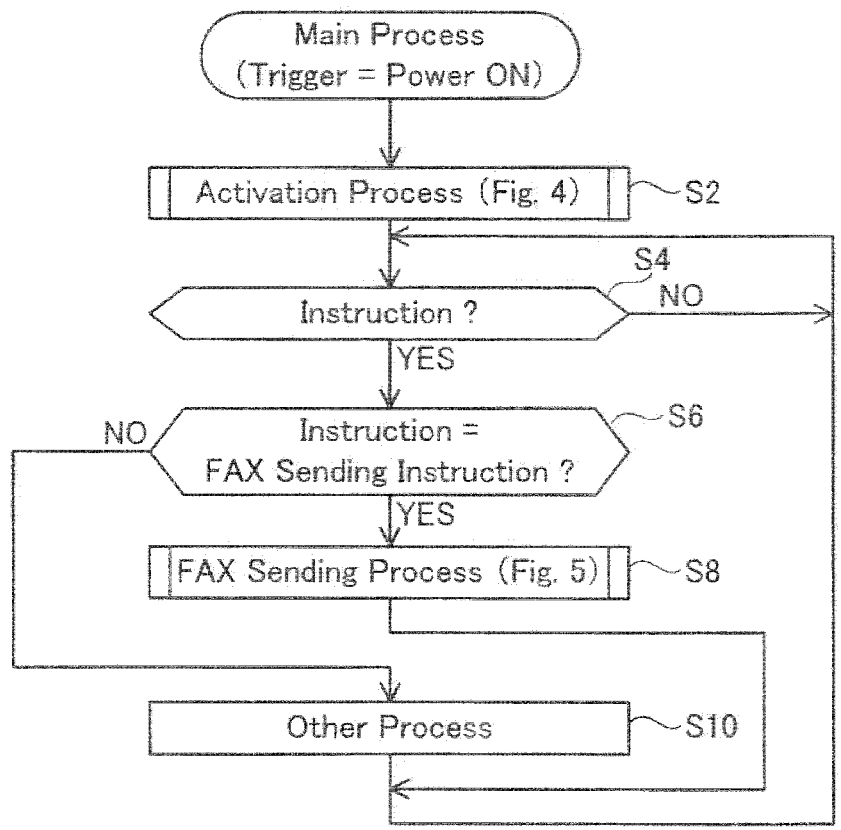
FIG. 2 shows a relationship between modes and settings.
FIG. 3 shows a flow chart of a main process.

By operating the operation unit 14, the user can select a mode for transmitting FAX data. As shown in FIG. 2, the user can select a mode from three modes including "IPFAX Priority", "IPFAX Exclusive", and "IPFAX OFF". In "IPFAX Priority", the FAX device 10 transmits FAX data by executing the IPFAX function, and when the transmission fails, transmits the FAX data by executing the PSTNFAX function. In "IPFAX Exclusive", the FAX device 10 transmits the FAX data by executing the IPFAX function and does not execute the PSTNFAX function even if the transmission fails. In "IPFAX OFF", the FAX device 10 executes the PSTNFAX function without executing the IPFAX function.

When one of the three modes is selected by the user, information corresponding to the selected mode is stored in the memory 32. Specifically, when "IPFAX Priority" is selected, the memory 32 stores "ON" as an IPFAX setting and stores "ON" as a retry setting. When "IPFAX Exclusive" is selected, the memory 32 stores "ON" as the IPFAX setting and stores "OFF" as the retry setting. When "IPFAX OFF" is selected, the memory 32 stores "OFF" as the IPFAX setting and stores "ON" as the retry setting. Moreover, in the present embodiment, the IPFAX setting of "OFF" is never stored in combination with the retry setting of "OFF".

(Main Process)

Next, a process that is executed by the FAX device 10 will be described. As shown in FIG. 3, the controller unit 24 of the FAX device 10 executes a main process when power of the FAX device 10 is turned on. In S2, the controller unit 24 executes an activation process (refer to FIG. 4). Next, in S4, the controller unit 24 monitors whether an instruction is inputted. An instruction may be inputted by an operation on the operation unit 14 or may be inputted from outside via the PSTN 4 or the LAN 6.

When the instruction has been inputted (when YES in S4), in S6, the controller unit 24 determines whether or not the instruction is a FAX sending instruction. The user can input the FAX sending instruction by operating the operation unit 14. Moreover, the FAX sending instruction includes the user designating a FAX number (a FAX number used in the PSTN 4) of a destination of the FAX data. The user may designate a FAX number from the address table 36 or may designate the FAX number by operating a numerical keypad of the operation unit 14.

Figure 5:
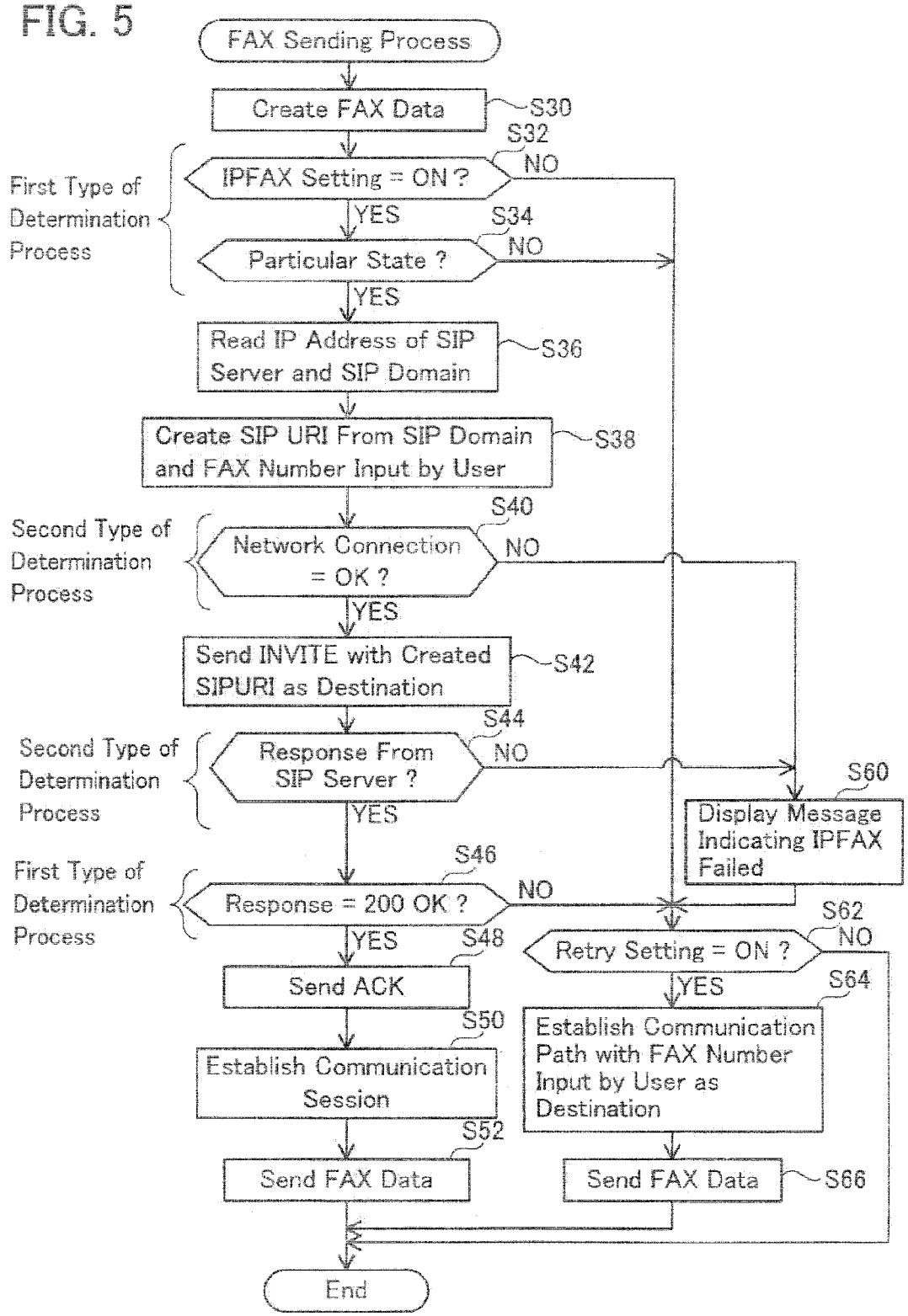
FIG. 5 shows a flow chart of a FAX sending process.

When the FAX sending instruction has been inputted (when YES in S6), in S8, the controller unit 24 executes a FAX sending process (refer to FIG. 5). On the other hand, when the FAX sending instruction has not been inputted (when NO in S6), in S10, the controller unit 24 executes a process corresponding to an inputted instruction (for example, a print performing instruction or a FAX data receiving instruction).

(Activation Process)

Next, contents of the activation process executed in S2 in FIG. 3 will be described. The activation process is a process for determining whether or not the FAX device 10 is in a particular state. In this case, a "particular state" refers to a state in which the FAX device 10 can execute an IPFAX sending process in which FAX data is transmitted using the SIPURI including the FAX number (the FAX number used in the PSTN 4) designated by the user as the destination of the FAX data (the SIPURI obtained by adding a predetermined domain to the FAX number). Moreover, the "particular state" can be restated as, for example, the state in which the user has already established the account with the specific provider.

Figure 4:
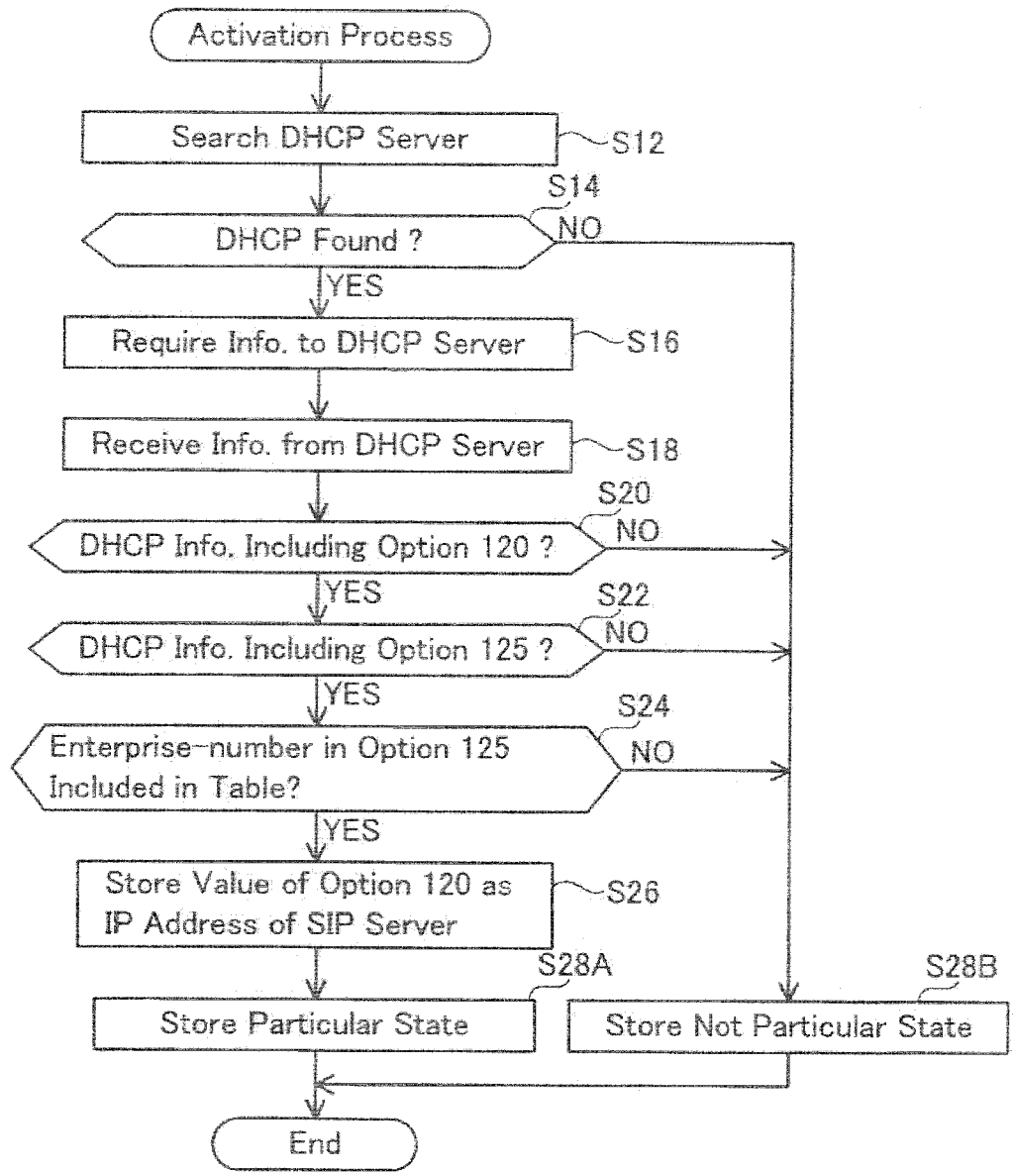
FIG. 4 shows a flow chart of an activation process.

As shown in FIG. 4, in S12, the controller unit 24 broadcasts a search command for searching the DHCP server 70 connected to the LAN 6. Upon receiving the search command, the DHCP server 70 transmits a response packet including an IP address of the DHCP server 70 to the FAX device 10. Next, in S14, the controller unit 24 determines whether or not the DHCP server 70 has been found. The controller unit 24 determines YES in S14 when the response packet is received within a predetermined period of time from the broadcast of the search command. If YES in S14, a progress is made to S16, and if NO in S14, a progress is made to S28B.

In S16, the controller unit 24 transmits a request command by setting the IP address of the DHCP server 70 included in the response packet as a destination. The request command is a command for requesting DHCP information including Option 120 and Option 125. A description of Option 120 and Option 125 will be given later. Upon receiving the request command, the DHCP server 70 transmits DHCP information to the FAX device 10. Consequently, in S18, the controller unit 24 receives the DHCP information.

Next, in S20, the controller unit 24 determines whether or not the DHCP information includes Option 120. For example, when the user of the FAX device 10 has an account with the specific provider, the user normally registers the IP address of the SIP server 60 which is provided by the specific provider to the DHCP server 70. In this case, the DHCP information includes Option 120 that indicates the IP address of the SIP server 60. If so, YES is determined in S20 and a progress is made to S22. On the other hand, for example, if the user does not have an account with the specific provider, the DHCP information normally does not include Option 120. In this case, NO is determined in S20 and a progress is made to S28B.

In S22, the controller unit 24 determines whether or not the DHCP information includes Option 125. For example, when the user of the FAX device 10 has the account with the specific provider, the user normally registers the enterprise-number of the specific provider to the DHCP server 70. In this case, the DHCP information includes Option 125 that indicates the enterprise-number of the specific provider. If so, YES is determined in S22 and a progress is made to S24. On the other hand, for example, if the user has the account with the specific provider but has not registered the enterprise-number of the specific provider to the DHCP server 70, it is possible that the DHCP information includes Option 120 but not Option 125. In addition, for example, if the user does not have the account with the specific provider but has an account with another provider that provides SIP communication, it is possible that the DHCP information similarly includes Option 120 but not Option 125. In this case, NO is determined in S22 and a progress is made to S28B. Moreover, for example, "another provider" is a provider that does not provide an IPFAX function using a SIPURI obtained by adding a predetermined domain to a FAX number but provides an IPFAX function using a SIPURI unrelated to a FAX number.

In S24, the controller unit 24 determines whether or not the enterprise-number included in Option 125 is consistent with any of the enterprise-numbers included in the table 34 (refer to FIG. 1). When the user has an account with the specific provider, the enterprise-number included in Option 125 is consistent with any of the enterprise-numbers included in the table 34. In this case, YES is determined in S24 and a progress is made to S26. On the other hand, for example, if the user has an account with another provider, the DHCP information includes Option 125 but the enterprise-number included in the Option 125 may not be consistent with any of the enterprise-numbers included in the table 34. In this case, NO is determined in S24 and a progress is made to S28B.

YES in S24 means that the FAX device 10 is determined as being in the particular state. In this case, in the present embodiment, a value indicated by Option 120 included in the DHCP information obtained in S18 is an IP address of the SIP server 60. In S26, the controller unit 24 stores the IP address of the SIP server 60 in the memory 32. Furthermore, in S28A, the controller unit 24 stores determination result information indicating that the FAX device 10 is in the particular state in the memory 32.

Moreover, a determination of NO in any of S14, S20, S22, and S24 means that the FAX device 10 has been determined as not being in the particular state. In this case, in S28B, the controller unit 24 stores in the memory 32 determination result information indicating that the FAX device 10 is not in the particular state.

(FAX Sending Process)

Next, contents of the FAX sending process executed in S8 in FIG. 3 will be described. Hereinafter, contents of the FAX sending process will be described using an example in which the user of the FAX device 10 designates the FAX number "xxxyyyzzzz" of the FAX device 110 as the destination of FAX data.

As shown in FIG. 5, in S30, the controller unit 24 creates FAX data by having the scan performing unit 16 scan an original document. Next, in S32, the first determination unit 40 (refer to FIG. 1) reads the IPFAX setting (refer to FIG. 2) from the memory 32 and determines whether or not the IPFAX setting is "ON". When the IPFAX setting is "ON" (when YES in S32), the first determination unit 40 determines that IPFAX transmission can be performed and proceeds to S34. On the other hand, if the IPFAX setting is "OFF" (when NO in S32), the first determination unit 40 determines that IPFAX transmission cannot be performed and does not execute S34. In this case, S60 (to be described later) is skipped (in other words, the notification unit 50 (refer to FIG. 1) does not notify the user) and a progress is made to S62.

In S34, the first determination unit 40 reads determination result information (refer to S28A and S20B in FIG. 4) from the memory 32 and determines whether the determination result information indicates that the FAX device 10 is in the particular state or that the FAX device 10 is not in the particular state. If the determination result information indicates that the FAX device 10 is in the particular state (when YES in S34), the first determination unit 40 determines that IPFAX transmission can be performed and proceeds to S36. On the other hand, if the determination result information indicates that the FAX device 10 is not in the particular state (when NO in S34), the first determination unit 40 determines that IPFAX transmission cannot be performed and the processes of S36 to S52 are not executed. In this case, S60 (to be described later) is skipped (in other words, the notification unit 50 does not notify the user) and a progress is made to S62.

In S36, the first communication unit 46 (refer to FIG. 1) reads the IP address and the SIP domain of the SIP server from the memory 32. As described above, when the FAX device 10 is in the particular state, the IP address of the SIP server 60 is stored in the memory 32 in S26 in FIG. 4. Therefore, in S36, the first communication unit 46 can read the IP address stored in advance in S26 in FIG. 4 from the memory 32.

However, even if the activation process in FIG. 4 is executed, the SIP domain "sip.com" of the SIP server 60 is not stored in the memory 32. Generally, when the user establishes an account with the specific provider (or after the user establishes an account with the specific provider), the specific provider provides the SIP domain of the SIP server 60 to the user. For example, the specific provider can provide the SIP domain of the SIP server 60 to the user by delivering a medium (for example, a sheet of paper) describing the SIP domain of the SIP server 60. In addition, the specific provider can provide the SIP domain of the SIP server 60 to the user by posting the SIP domain of the SIP server 60 on a website or the like. Therefore, for example, the user can store the SIP domain of the SIP server 60 in the memory 32 by performing a predetermined storing operation on the operation unit 14. In S36, the first communication unit 46 can read the SIP domain of the SIP server 60 stored by the user from the memory 32. Moreover, in a modification, when the SIP domain of the SIP server 60 is stored in advance in the DHCP server 70, the FAX device 10 may obtain the SIP domain of the SIP server 60 from the DHCP server 70.

Next, in S38, the first communication unit 46 adds the SIP domain "sip.com" read in S36 to the FAX number "xxx-yyyzzzz" designated as the destination of the FAX data by the user to create the SIPURI "xxxyyyzzzz@sip.com" (refer to FIG. 1) of the FAX device 110.

Next, in S40, the second determination unit 42 (refer to FIG. 1) determines whether or not the FAX device 10 is connected to a network (in other words, the LAN 6). In other words, the second determination unit 42 determines whether the FAX device 10 is in a link up state or in a link down state. Specifically, for example, when a LAN cable is connected to the network interface 22 of the FAX device 10, the second determination unit 42 determines that IPFAX transmission can be performed (makes a YES determination in S40). In addition, for example, even if a LAN cable is not connected to the network interface 22, when the FAX device 10 is wirelessly connected to the LAN 6 (in other words, when a state is established in which communication with an access point can be performed), the second determination unit 42 similarly determines that IPFAX transmission can be performed (makes a YES determination in S40). Therefore, if a LAN cable is not connected to the network interface 22 and, at the same time, the FAX device 10 is not wirelessly connected to the LAN 6, the second determination unit 42 determines that IPFAX transmission cannot be performed (makes the NO determination in S40).

When it is determined that the FAX device 10 is connected to a network (when YES in S40), in S42, the first communication unit 46 transmits an INVITE command in which the IP address of the SIP server 60 read in S36 is specified as a SIP server address. Moreover, in the INVITE command, the SIPURI of the FAX device 110 created in S38 is also specified as a destination address. Once S42 is concluded, a progress is made to S44.

As described above, in the INVITE command, the IP address of the SIP server 60 is specified as the SIP server address. Therefore, the INVITE command first reaches the SIP server 60. As described above, the SIP server 60 stores the SIPURI of the FAX device 110 and the IP address of the FAX device 110 in association with each other. The SIP server 60 first identifies the SIPURI of the FAX device 110 specified as the destination address from the INVITE command. Next, the SIP server 60 identifies the IP address of the FAX device 110 associated with the SIPURI of the FAX device 110 from a memory of the SIP server 60. The SIP server 60 then transmits the INVITE command by setting the IP address of the FAX device 110 as a destination (in other words, transfers the INVITE command to the FAX device 110).

Upon receiving the INVITE command, the FAX device 110 normally transmits a 200 OK command to the SIP server 60. In this case, the SIP server 60 transfers the 200 OK command to the FAX device 10. Therefore, the FAX device 10 may receive the 200 OK command from the SIP server 60.

However, for example, when the FAX device 110 cannot execute the IPFAX function (for example, when the user of the FAX device 110 has made a setting that disables IPFAX transmission), the FAX device 10 does not transmit the 200 OK command to the SIP server 60. In this case, the SIP server 60 transmits a command other than the 200 OK command to the FAX device 10. Therefore, the FAX device 10 may also receive other commands from the SIP server 60.

Moreover, while the description above is premised on the SIP server 60 functioning properly, it is possible that the SIP server 60 is not functioning properly (for example, when the power of the SIP server 60 is turned off). In this case, the SIP server 60 cannot receive or transfer the INVITE command and no commands can be transmitted to the FAX device 10. Therefore, the FAX device 10 may not receive a command from the SIP server 60.

In S44, the second determination unit 42 (refer to FIG. 1) determines whether or not any command has been received from the SIP server 60. When the second determination unit 42 does not receive any commands from the SIP server 60 within a predetermined period of time after transmitting the INVITE command in S42 (for example, when the SIP server 60 is not functioning properly), the second determination unit 42 determines that IPFAX transmission cannot be performed (makes a determination of NO in S44). In this case, a progress is made to S60. On the other hand, when the second determination unit 42 receives any command from the SIP server 60, the second determination unit 42 determines that IPFAX transmission can be performed (makes a determination of YES in S44). In this case, a progress is made to S46.

In S46, the first determination unit 40 determines whether or not the command received from the SIP server 60 is a 200 OK command. When another command is received from the SIP server 60 (for example, when the user of the FAX device 110 has made a setting that disables IPFAX transmission), the first determination unit 40 determines that IPFAX transmission cannot be performed (makes a determination of NO in S46). In this case, S60 (to be described later) is skipped (in other words, the notification unit 50 does not notify the user) and a progress is made to S62.

On the other hand, when the 200 OK command is received from the SIP server 60, the first determination unit 40 determines that IPFAX transmission can be performed (makes a determination of YES in S46). In this case, in S48, the first communication unit 46 transmits an ACK command to the SIP server 60. The ACK command is transmitted to the FAX device 110 via the SIP server 60. Consequently, in S50, a communication session is established between the FAX device 10 and the FAX device 110. Next, in S52, the first communication unit 46 transmits the FAX data created in S30 to the FAX device 110 using the communication session established in S50. Moreover, in S52, the FAX data is transmitted from the FAX device 10 to the FAX device 110 without being transferred by the SIP server 60 (in other words, peerto-peer communication is performed). The FAX sending process finishes upon completion of transmission of the FAX data.

In S60, the notification unit 50 causes the display unit 12 to display a message indicating that IPFAX transmission cannot be performed. Moreover, the message includes both a reason why an error has occurred in which communication cannot be performed and a countermeasure for resolving the reason. For example, when the FAX device 10 is not connected to a network (when NO in S40), the notification unit 50 causes the display unit 12 to display a character string indicating that the FAX device 10 is not connected to a network (in other words, the reason) and a character string prompting a LAN cable to be connected to the network interface 22 (in other words, the countermeasure). In addition, for example, when a command has not been received from the SIP server 60 (when NO in S44), the notification unit 50 causes the display unit 12 to display a character string indicating that the SIP server 60 is not functioning properly (in other words, the reason) and a character string prompting an inquiry to be made to the provider (in other words, the countermeasure). Moreover, as is apparent from the description above, contents displayed on the display unit 12 (contents notified to the user) differ between when NO is determined in S40 and when NO is determined in S44.

Since the reason and the countermeasure of the error are notified in S60, the user can execute an operation for removing the reason why IPFAX transmission cannot be performed (in other words, the countermeasure for enabling communication in accordance with SIP to be performed). Once S60 is concluded, a progress is made to S62.

In S62, the third determination unit 44 (refer to FIG. 1) reads the retry setting (refer to FIG. 2) from the memory 32 and determines whether or not the retry setting is "ON". When the retry setting is "ON" (when YES in S62), a progress is made to S64. When the retry setting is "OFF" (when NO in S62), S64 and S66 are skipped and the FAX sending process is finished.

In S64, the second communication unit 48 (refer to FIG. 1) executes an outbound call process in accordance with the G.3 communication scheme using the FAX number "xxx-yyyzzzz" designated as the destination of the FAX data by the user. Consequently, a communication path via the PSTN 4 is established between the FAX device 10 and the FAX device 110. Next, in S66, the second communication unit 48 transmits the FAX data created in S30 to the FAX device 110 using the communication path established in S64. The FAX sending process finishes upon completion of transmission of the FAX data.

ADVANTAGEOUS EFFECT OF PRESENT EMBODIMENT

With a conventionally known FAX device, a user designates a FAX number (in other words, a numerical string) as a destination of FAX data in order to transmit the FAX data via the PSTN 4. With the FAX device 10 according to the present embodiment, performing a similar operation enables the user to transmit FAX data in accordance with the IPFAX function instead of transmitting the FAX data via the PSTN 4. In other words, when "IPFAX Priority" or "IPFAX Exclusive" (refer to FIG. 2) is selected as the mode for transmitting FAX data, a designation of the FAX number by the user as the destination of the FAX data enables the FAX device 10 to transmit the FAX data in accordance with the IPFAX function (refer to S30 to S52 in FIG. 5). Therefore, by designating a FAX number, the user can cause the FAX device 10 to execute the IPFAX function even if the SIPURI is not designated as the destination of the FAX data. Normally, the SIPURI is a character string more complicated than a FAX number. According to the present embodiment, when the user designates the FAX number that is a simple numerical string, the FAX device 10 transmits the FAX data in accordance with the IPFAX function. Therefore, the user can easily cause the FAX device 10 to execute the IPFAX function.

In particular, in the present embodiment, various determination processes (S32, S34, S40, S44, and S46) are executed in the FAX sending process in FIG. 5. According to this configuration, the FAX device 10 can appropriately determine whether or not IPFAX transmission can be performed in accordance with the SIP communication scheme. As is apparent from FIG. 5, while the determination of NO made in S32, S34, or S46 results in the notification process of S60 not being executed, the determination of NO made in S40 or S44 results in the notification process of S60 being executed. Hereinafter, the respective former determination processes (S32, S34, and S46) will be referred to as a "first type of determination process" and the respective latter determination processes (S40 and S44) will be referred to as a "second type of determination process". Moreover, the determination process of S62 will be referred to as a "third type of determination process".

According to the configuration described above, the FAX device 10 executes the first type of determination process and the second type of determination process to determine whether or not FAX transmission can be performed in accordance with the SIP communication scheme. As shown in FIG. 6, when it is determined in the first type of determination process and the second type of determination process that FAX transmission can be performed in accordance with the SIP communication scheme, the FAX device 10 performs FAX transmission in accordance with the SIP communication scheme (S52 in FIG. 5). On the other hand, when it is determined in the first type of determination process or the second type of determination process that FAX transmission cannot be performed in accordance with the SIP communication scheme and, at the same time, it is determined in the third type of determination process that the retry setting is "ON", the FAX device 10 performs FAX transmission in accordance with the G.3 communication scheme (S66 in FIG. 5). Therefore, since the FAX device 10 can perform FAX transmission in accordance with the G.3 communication scheme even if IPFAX transmission cannot be performed in accordance with the SIP communication scheme, the FAX device 10 can appropriately perform transmission of the FAX data.

In particular, as shown in FIG. 6, the FAX device 10 does not notify the user when the negative determination is made in the first type of determination process but notifies the user when the negative determination is made in the second type of determination process (S60 in FIG. 5). Hereinafter, respective processes included in the first type of determination process and the second type of determination process will be described in detail.

The NO determination in S32 included in the first type of determination process means that the user does not desire to perform IPFAX transmission. Therefore, when NO is determined in S32, since a notification to the user is conceivably unnecessary, the FAX device 10 does not notify the user. In addition, the NO determination in S34 included in the first type of determination process means that, for example, the user has not established an account with the specific provider. In other words, the NO determination in S34 means that the user does not desire to perform IPFAX transmission using a SIPURI including a FAX number. Therefore, when NO is determined in S34, since a notification to the user is conceivably unnecessary, the FAX device 10 does not notify the user. Furthermore, the NO determination in S46 included in the first type of determination process means that, for example, the FAX device 110 cannot execute the IPFAX function. The user of the FAX device 10 is unable to set the FAX device 110 which is owned by another user to a state in which the IPFAX function can be executed. Therefore, similarly, when NO is determined in S46, since a notification to the user is conceivably unnecessary, the FAX device 10 does not notify the user.

The NO determination in S40 included in the second type of determination process means that the FAX device 10 is not connected to a network even though the user desires to perform IPFAX transmission. Therefore, when NO is determined in S40, since a notification to the user is conceivably necessary, the FAX device 10 notifies the user (S60 in FIG. 5). In addition, the NO determination in S44 included in the second type of determination process means that the SIP server 60 is not functioning properly even though the user desires to perform IPFAX transmission. Therefore, when NO is determined in S44, since a notification to the user is conceivably necessary, the FAX device 10 notifies the user (S60 in FIG. 5).

As described above, the present embodiment adopts a configuration in which a notification to the user is not performed when it is determined that IPFAX transmission cannot be performed due to a reason that need not be notified to the user (when the NO determination is made in the first type of determination process) and a notification to the user is performed when it is determined that IPFAX transmission cannot be performed due to a reason that needs to be notified to the user (when the NO determination is made in the second type of determination process). Therefore, the user can be appropriately notified that IPFAX transmission cannot be performed.

In addition, in the present embodiment, the FAX device 10 executes S32 included in the first type of determination process before performing S34 included in the first type of determination process. The FAX device 10 does not execute S34 when the NO determination is made in S32. Therefore, a processing load of the FAX device 10 can be reduced.

Furthermore, the FAX device 10 executes the determination process of S34 before executing the second type of determination process of S40 and S44. The FAX device 10 does not execute the second type of determination process of S40 and S44 when the NO determination is made in S34. Therefore, the processing load of the FAX device 10 can be reduced.

Moreover, the FAX device 10 perform FAX transmission in accordance with the G.3 communication scheme when the retry setting is ON (when YES in S62), and does not perform FAX transmission in accordance with the G.3 communication scheme when the retry setting is OFF (when NO in S62). Therefore, the FAX device 10 can perform FAX transmission in accordance with the G.3 communication scheme depending on the user's intention (depending on a selection of a mode in FIG. 2).

(Correspondence Relationship)

The FAX device 10 is an example of a "communication device". The SIP communication scheme and the G.3 communication scheme are respectively examples of a "first communication scheme" and a "second communication scheme". The information notified in S60 in FIG. 5 is an example of "specific information". In addition, the IPFAX setting of ON in FIG. 2, the enterprise-number included in the table 34 in FIG. 1, and the retry setting of ON in FIG. 2 are respectively examples of "first information", "second information", and "third information". Furthermore, the determination process of S32 and the determination process of S34 are respectively examples of a "first determination process" and a "second determination process", and the determination process of S40 and the determination process of S44 are respectively examples of a "third determination process" and a "fourth determination process".

(First Modification)

In the embodiment described above, while S32, S34, and S46 in FIG. 5 are examples of the "first type of determination process", only one or two of S32, S34, and S46 may be executed. In other words, the "first type of determination process" may include at least one determination process of S32, S34, and S46. In a similar manner, the "second type of determination process" may include at least one determination process of S40 and S44 in FIG. 5. Moreover, the determination process of S46 in FIG. 5 may be included in the "second type of determination process" instead of in the "first type of determination process". In other words, when the NO determination is made in S46 in FIG. 5, a progress may be made to S60.

(Second Modification)

While the notification unit 50 notifies both the reason and the countermeasure to the user in S60 in FIG. 5, only one of the reason and the countermeasure may be notified to the user. In other words, the notification unit 50 may notify at least one of the reason and the countermeasure to the user.

(Third Modification)

The DHCP server 70 may double as the SIP server. In other words, the SIP server may be provided inside the LAN 6 in addition to the SIP server 60 outside of the LAN 6. In this case, the INVITE command may be transmitted to the SIP server 60 outside of the LAN 6 via the SIP server inside the LAN 6.

(Fourth Modification)

While the FAX device 10 is an example of a "communication device" in the embodiment described above, for example, the "communication device" may be a telephone. In this case, audio data is an example of "target data". Moreover, other types of data such as text data may be adopted as the "target data". For example, the "communication device" may be a PC, a server, a scanner, or the like.

(Fifth Modification)

Instead of the configuration in which the process of FIG. 4 is executed upon activation of the FAX device 10, a configuration may be adopted in which the process of FIG. 4 is executed at a different timing from the activation of the FAX device 10 (for example, at a timing when an instruction is received from the user).

(Sixth Modification)

In the foregoing embodiment, respective units 40 to 50 are realized as a result of the control device 24 performing the processes according to a computer program. Nevertheless, at least one unit of respective units 40 to 50 may alternately be realized by a hardware resource such as a logic circuit.

What is claimed is:

1. A communication device comprising:
   one or more processors; and
   a memory that stores a computer program including instructions executed by the one or more processors,
   wherein the instructions cause the one or more processors, when executed by the one or more processors, to function as:
   a first determination unit configured to execute a first type of determination process that determines, based on a first type of determination standard, whether the communication device can perform communication of target data of a communication target in accordance with a first communication scheme;

a second determination unit configured to execute a second type of determination process that determines, based on a second type of determination standard which is different from the first type of determination standard, whether the communication device can perform communication of the target data in accordance with the first communication scheme;

a first communication unit configured to perform communication of the target data in accordance with the first communication scheme, if it is determined in the first type of determination process that the communication device can perform communication of the target data, and it is determined in the second type of determination process that the communication device can perform communication of the target data;

a second communication unit configured to perform communication of the target data in accordance with a second communication scheme which is different from the first communication scheme, if it is determined in the first type of determination process that the communication device can not perform communication of the target data; and a notification unit configured to notify a user of specific information, if it is determined in the second type of determination process that the communication device can not perform communication of the target data, the specific information indicating that the communication device can not perform communication of the target data in accordance with the first communication scheme, wherein the notification unit is configured not to notify the user of the specific information, if it is determined in the first type of determination process that the communication device can not perform communication of the target data.

2. The communication device as in claim 1, wherein the second communication unit is configured to further perform communication of the target data in accordance with the second communication scheme after the notification unit notifies the user of the specific information, if it is determined in the second type of determination process that the communication device can not perform communication of the target data.

3. The communication device as in claim 1, wherein the first type of determination process includes at least one of:

a first determination process that determines whether the communication device is storing first information indicating that the user desires the communication device to perform communication in accordance with the first communication scheme; and a second determination process that determines whether the communication device can obtain second information for performing communication in accordance with the first communication scheme, and the second type of determination process includes at least one of:

a third determination process that determines whether the communication device is being connected with a network; and a fourth determination process that determines whether the communication device has received a response from an intermediate server that intermediates communication in accordance with the first communication scheme when the communication device has sent a signal to the intermediate server.

4. The communication device as in claim 3, wherein the first determination unit is configured to execute the first determination process before the second determination process, the first determination unit is configured to execute the second determination process, if it is determined in the first determination process that the communication device is storing the first information, and the first determination unit is configured to determine that the communication device can not perform communication of the target data without executing the second determination process, if it is determined in the first determination process that the communication device is not storing the first information.

5. The communication device as in claim 3, wherein the first determination unit is configured to execute the second determination process before the second determination unit executes the second type of determination process, the second determination unit is configured to execute the second type of determination process, if it is determined in the second determination process that the communication device can obtain the second information, and the second determination unit is configured not to execute the second type of determination process, if it is determined in the second determination process that the communication device can not obtain the second information.

6. The communication device as in claim 1, wherein the instructions cause the one or more processors, when executed by the one or more processors, to further function as:

a third determination unit configured to execute a third type of determination process that determines whether the communication device is storing third information indicating that the user desires the communication device to perform communication in accordance with the second communication scheme, wherein if it is determined in the first type of determination process that the communication device can not perform communication of the target data, in a case where it is determined in the third type of determination process that the communication device is storing the third information, the second communication unit is configured to perform communication of the target data in accordance with the second communication scheme, and in a case where it is determined in the third type of determination process that the communication device is not storing the third information, the second communication unit is configured not to perform communication of the target data in accordance with the second communication scheme.

7. The communication device as in claim 1, wherein the specific information includes at least one of:

a reason why the communication device can not perform communication in accordance with the first communication scheme; and a countermeasure that enables the communication device to perform communication in accordance with the first communication scheme.

8. The communication device as in claim 1, wherein the first communication scheme is a communication scheme for performing IP communication by utilizing IP identification information obtained by adding a predetermined domain to identification information designated as a destination of the target data by the user, and the second communication scheme is a communication scheme for performing communication via general public networks by utilizing the identification information designated as the destination of the target data by the user.

9. A communication device comprising:

a first determination unit configured to execute a first type of determination process that determines, based on a first type of determination standard, whether the communication device can perform communication of target data of a communication target in accordance with a first communication scheme;

a second determination unit configured to execute a second type of determination process that determines, based on a second type of determination standard which is different from the first type of determination standard, whether the communication device can perform communication of the target data in accordance with the first communication scheme;

a first communication unit configured to perform communication of the target data in accordance with the first communication scheme, if it is determined in the first type of determination process that the communication device can perform communication of the target data, and it is determined in the second type of determination process that the communication device can perform communication of the target data;

a second communication unit configured to perform communication of the target data in accordance with a second communication scheme which is different from the first communication scheme, if it is determined in the first type of determination process that the communication device can not perform communication of the target data; and a notification unit configured to notify a user of specific information, if it is determined in the second type of determination process that the communication device can not perform communication of the target data, the specific information indicating that the communication device can not perform communication of the target data in accordance with the first communication scheme, wherein the notification unit is configured not to notify the user of the specific information, if it is determined in the first type of determination process that the communication device can not perform communication of the target data.

10. A non-transitory computer-readable storage medium storing a computer program for a communication device, the computer program including instructions for causing one or more processors of the communication device to perform:

executing a first type of determination process that determines, based on a first type of determination standard, whether the communication device can perform communication of target data of a communication target in accordance with a first communication scheme;

executing a second type of determination process that determines, based on a second type of determination standard which is different from the first type of determination standard, whether the communication device can perform communication of the target data in accordance with the first communication scheme;

performing communication of the target data in accordance with the first communication scheme, if it is determined in the first type of determination process that the communication device can perform communication of the target data, and it is determined in the second type of determination process that the communication device can perform communication of the target data;

performing communication of the target data in accordance with a second communication scheme which is different from the first communication scheme, if it is determined in the first type of determination process that the communication device can not perform communication of the target data; and notifying a user of specific information, if it is determined in the second type of determination process that the communication device can not perform communication of the target data, the specific information indicating that the communication device can not perform communication of the target data in accordance with the first communication scheme, wherein the notifying the user of the specific information is not executed, if it is determined in the first type of determination process that the communication device can not perform communication of the target data.

* * * * *